Oct. 29, 1963  H. S. SPACIL ETAL  3,109,118
GAS DISCHARGE HEATING DEVICE
Filed Jan. 25, 1962
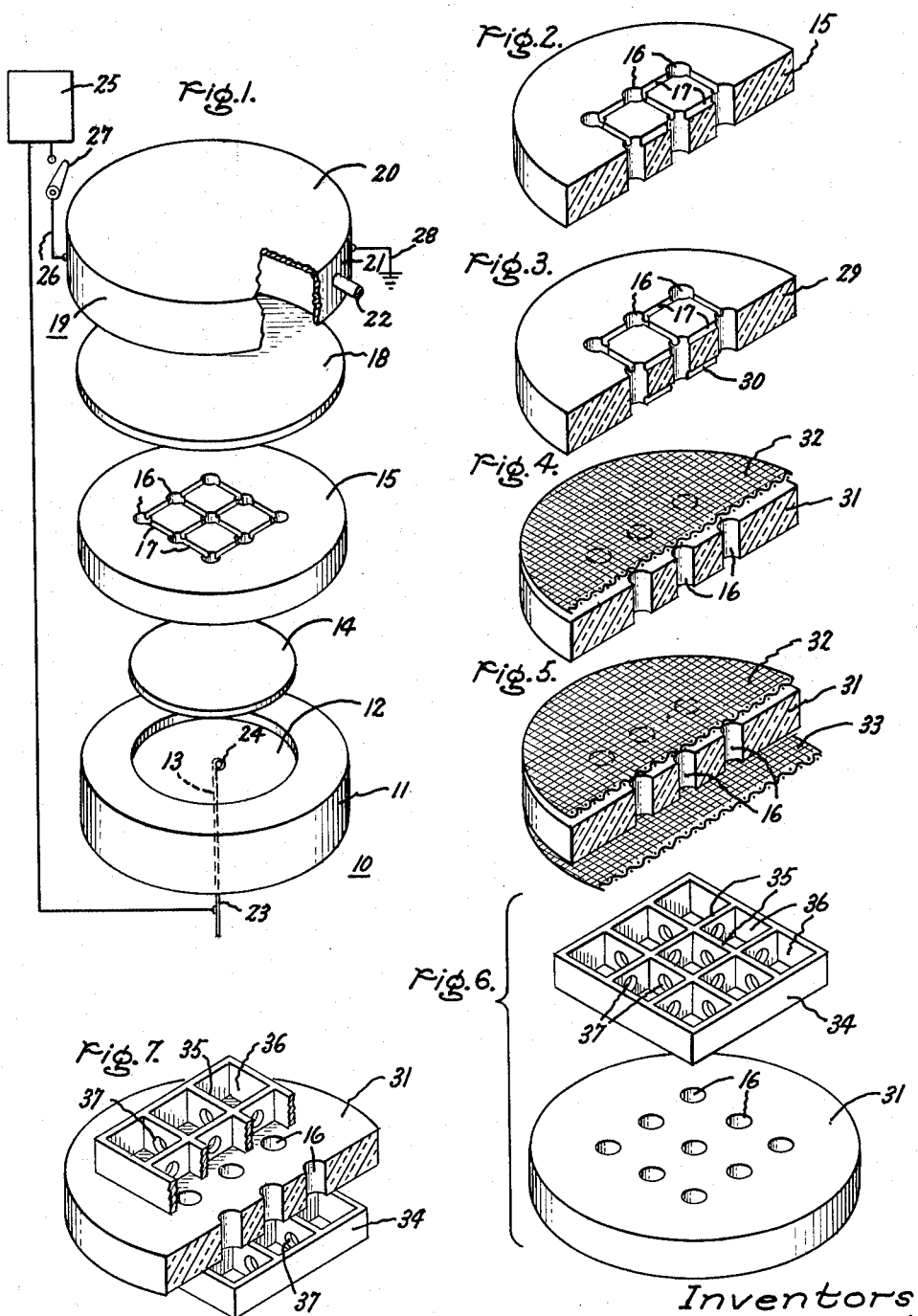
Inventors:
Henry S. Spacil,
William E. Tragert,
by Paul R. Webb, II
Their Attorney.

United States Patent Office 3,109,118
Patented Oct. 29, 1963

3,109,118
GAS DISCHARGE HEATING DEVICE
Henry S. Spacil, Schenectady, and William E. Tragert, Scotia, N.Y., assignors to General Electric Company, a corporation of New York
Filed Jan. 25, 1962, Ser. No. 168,642
7 Claims. (Cl. 313—204)

This invention relates to heating devices and more particularly to glow discharge heating devices.

Present heating devices employ a heating element beneath a thick cooking surface. The element is heated by electrical energy which heat is transmitted to the cooking surface. A thick cooking surface is necessary to provide uniform cooking heat from the concentrated heat source of the heating element. It would be desirable to provide a more compact heating device in which the thick cooking surface is eliminated.

It is an object of our invention to provide a heating device.

It is another object of our invention to provide a heating device without a thick cooking surface.

It is a further object of our invention to provide a compact heating device employing glow discharge heating.

In carrying out our invention in one form a heating device comprises an insulating member, a first electrode positioned on the member, an insulating layer positioned on the first electrode, the layer having a plurality of perforations therethrough, ion conducting means joining adjacent perforations, a second electrode positioned on the layer, an electrically conductive container positioned on the member in gas-tight relationship therewith and contacting the second electrode, a gas at sub-atmospheric pressure within the container, an electrical lead contacting the first electrode, a second electrical lead contacting the container, the leads adapted to be connected to a power source, and a ground lead for the container.

These and various other objects, features and advantages of the invention will be better understood from the following description taken in connection with the accompanying drawing in which:

FIGURE 1 is an exploded view of a heating device embodying my invention;

FIGURE 2 is a perspective view partially in section of the insulating layer shown in FIGURE 1;

FIGURE 3 is a perspective view partially in section of a modified insulating layer;

FIGURE 4 is a perspective view partially in section of a modified insulating layer assembly;

FIGURE 5 is a perspective view partially in section of another modified insulating layer assembly;

FIGURE 6 is an exploded view of a further modified insulating layer assembly; and FIGURE 7 is a perspective view partially in section of a still further modified insulating layer assembly.

In FIGURE 1 of the drawing a heating device is shown generally at 10 which comprises an insulating member 11 having a centrally disposed recessed portion 12 in its upper surface and a central aperture 13 therethrough. A sheet electrode 14 is positioned within recessed portion 12 of member 11. An insulating layer 15 having the same diameter as member 11 is positioned on the top surface of member 11 and in contact with electrode 14. A series of perforations 16 are disposed centrally in insulating layer 15. As is best shown in FIGURE 2, each of these perforations is connected to adjacent perforations by means of ion conducting grooves 17. A second electrode 18 is positioned on insulating layer 15.

A container 19 having a flat upper surface 20 and a cylindrical wall 21 is positioned on member 11 in gas-tight relationship therewith and its upper surface 20 is in direct contact with electrode 18. Container 19 can be joined to upper edge of member 11 in any suitable manner. Wall 21 can also surround a part of the side wall of member 11 or surround the entire side wall of member 11 prior to being joined thereto. A tube 22 is connected to side wall 21 of container 19 whereby the device is evacuated. A lead 23 contacts electrode 14, for example, in the form of a coil 24, and extends through aperture 13 in member 11 to a power source 25. Aperture 13 with lead 23 therein is sealed in any suitable manner to provide a gas-tight seal for container 19. A second lead 26 is connected from container 19 to power source 25. A switch 27 is provided in lead 26 between container 19 and power source 25 to provide electrical energy to heater 10. A suitable ground lead 28 is also provided from container 19.

FIGURE 3 shows a modified insulating layer 29 which has a plurality of centrally disposed perforations 16 therethrough. Ion conducting grooves 17 connects adjacent perforations 16 on one surface of member 29 while additional ion conducting grooves 30 are provided on the opposite surface of layer 29 to connect adjacent perforations 16. In this manner, an improved ion conducting path is established for the discharge between electrodes 14 and 18 through apertures 16.

In the absence of an ion conducting path connecting adjacent perforations 16, as shown by grooves 17 in FIGURES 1 and 2, and grooves 17 and 30 in FIGURE 3, a glow discharge is initiated between opposed electrodes through one or several perforations in a non-uniform manner. After initiation of such a glow discharge, the discharge continues in the same manner with non-uniform heating of electrode 18 and associated surface 20. When this condition has occurred, further discharge is not initiated through the remaining perforations. The ion conducting paths enable a discharge to be initiated and maintained in all perforations to provide uniform heating of electrode 18 and its associated surface 20.

In FIGURE 4 of the drawing there is shown a modified insulating layer assembly which includes an insulating layer 31 with a plurality of centrally disposed perforations 16 therethrough. An ion conducting path is provided in the form of a metallic screen 32 which is positioned on one surface of layer 31.

In FIGURE 5 of the drawing, there is shown another modified insulating layer assembly including an insulating layer 31 with a plurality of perforations 16 therethrough. Metal screen 32 is positioned on the upper surface of layer 31. A second similar screen 33 is positioned against the lower surface of layer 31. In this manner, an increased ion conducting path is provided to produce uniform glow discharge between opposite electrodes 14 and 18 through the perforations 16 in heater device 10.

In FIGURE 6, there is shown a further modified insulating layer assembly including insulating layer 31 with a plurality of centrally disposed perforations 16 therethrough. A support member 34 is positioned on one surface of layer 31. Support member 34 comprises a plurality of enclosure members 35 with spaces 36 therebetween which spaces 36 communicate with perforations 16. Additionally, an aperture 37 is provided in each enclosure member 35 separating adjacent perforations 16. Support member 34 with apertures 37 and spaces 36 provides an ion conducting path between adjacent perforations 16.

In FIGURE 7, there is shown a still further modified insulating layer assembly including insulating layer 31 with a plurality of centrally disposed perforations 16 therethrough. Support members 34 are positioned against both the upper and lower surfaces of layer 31. Each support member 34 comprises a plurality of enclosure members 35 with spaces 36 therebetween which spaces 36 communicate with perforations 16. Additionally, an aperture 37 is provided in each enclosure member 35 separating adjacent perforations 16. Support members 34 with apertures 37 and spaces 36 provide an ion conducting path between adjacent perforations 16.

We discovered that a heating device employing a glow discharge could be constructed of an insulating member, a first electrode positioned on the member, an insulating layer positioned on the first electrode, the layer having a plurality of perforations therethrough, ion conducting means joining adjacent perforations, a second electrode positioned on the layer, an electrically conductive container positioned on the member in gas-tight relationship therewith and contacting the second electrode, a gas at sub-atmospheric pressure within the container, an electrical lead contacting the first electrode, a second electrical lead contacting the container, the leads adapted to be connected to a power source, and a ground lead for the container. We found further that this heating device would confine the glow discharge to the volumes bounded by the electrodes and the walls of the perforations leading to conversion of electrical energy into heat. The insulating layer serves as a spacer for the electrodes so that the electrodes need not be self-supporting. The heat from the second electrode is transmitted to its associated upper surface of the container to provide a cooking surface.

We found further that it was necessary to have an ion conducting path connecting adjacent perforations in the insulating layer between the electrodes to provide for a uniform glow discharge. In the absence of such an ion conducting path, a glow discharge might be initiated and maintained between the opposed electrodes through one or several of the perforations. Subsequently, a glow discharge would not be initiated or maintained through the other perforations, resulting in non-uniform heating of the second electrode and the associated upper surface of the container. Such an ion conducting path is necessary to connect adjacent perforations. In this manner, if a discharge is initiated through one or more of the perforations in the insulating layer, the ion conducting path enables the discharge to be initiated and maintained in the other perforations. We found that such an ion conducting path, which connects adjacent perforations, might take the form of grooves on either or both surfaces of the insulating layer, a screen on either or both surfaces of the insulating layer or a supporting member on either or both surfaces of the insulating layer.

In the operation of the device shown in FIGURE 1 of the drawing, a ceramic insulating member 11 is provided with a centrally disposed recessed portion 12 in its upper surface and a central aperture 13 therethrough. An electrical lead 23 is positioned in the bottom of recessed portion 12 in the form of a coil 24, and extends through aperture 13 to a power source 25. Aperture 13 with lead 23 therein is sealed to provide a gas-tight seal for container 19. A sheet electrode 14 of the same diameter as recess 12 is fitted within the recess and contacts coil 24 of lead 23. An insulating layer 15 with a plurality of centrally disposed perforations 16 is placed on the upper surface of member 11 and in contact with electrode 14. An ion conducting path is provided by grooves 17 connecting adjacent apertures 16 on the upper surface of layer 15. Perforations 16 are disposed centrally within layer 15 so that one open end of each of these perforations contacts electrode 14. A second electrode is positioned on the upper surface of layer 15 in contact with the opposite open end of each of perforations 16. A container 19 having an upper surface 20 and a cylindrical wall 21 is placed on member 11 in gas-tight relationship therewith and its upper surface 20 is in contact with electrode 18. Container 19 can be affixed to member 11 in any suitable manner. Wall 21 can also cover partially or completely the side wall of member 11. A suitable gas or gaseous mixture such as argon, a mixture of hydrogen and argon, helium, or a mixture of hydrogen and helium is provided within container 19 which is evacuated through tube 22 to sub-atmospheric pressure. Tube 22 is then sealed off. A second lead 26 is connected from container 19 to power source 25. A suitable ground lead 28 is provided from container 19.

After power source 25 is activated by switch 27, a glow discharge is initiated between electrodes 14 and 18 through perforations 16. In the event that the initiation of the glow discharge is through only one or more perforations 16, the ion conducting path in the form of grooves 17 will initiate and maintain a discharge through the other perforations. This discharge will convert a portion of the electrical energy from power source 25 to heat at electrode 18 which heats upper surface 20 of container 19 in a uniform manner.

The heating device of FIGURE 1 can be modified by substituting insulating layer 29 of FIGURE 3 for insulating layer 15. Thus, an additional ion conducting path is provided by grooves 30. The insulating layer assembly shown in FIGURES 4, 5, 6, or 7 can be also substituted for insulating layer 15 in FIGURE 1. If insulating layer 29 of FIGURE 3 or the insulating layer assembly of FIGURES 4, 5, 6, or 7 is substituted for insulating layer 15, heating device 10 operates in the manner described above.

In FIGURE 3, an ion conducting path is provided by both grooves 17 and 30 on opposite surfaces of insulating layer 29. In FIGURE 4, screen 32 is provided on one surface of insulating layer 31, while in FIGURE 5, screens 32 and 33 are provided on both surfaces of insulating layer 31 to produce ion conducting paths connecting adjacent perforations 16. In FIGURE 6, a support member 34 comprising a plurality of enclosure members 35 with spaces 36 and apertures 37 therein produces an ion conducting path between adjacent apertures. In FIGURE 7, a support member 34 is positioned on both surfaces of layer 31. The ion conducting path connecting adjacent perforations 16 in each of the above figures of the drawing produces a uniform glow discharge through the perforations resulting in a uniform heating of electrode 18 and the associated upper surface 20 of container 19.

An example of a heating device produced in accordance with the present invention is as follows:

A heating device was constructed generally in accordance with FIGURES 1 and 4 of the drawing wherein the insulating layer was a 1/8 inch thick layer of felted aluminum silicate fiber. The insulating layer was perforated with 25 holes arranged within a two-inch square. An ion conducting path was provided in the form of a nickel screen which connected adjacent perforations. Each perforation was 3/16 inch in diameter. A sheet nickel electrode and a sheet copper electrode were positioned on opposite sides of the insulating layer with the nickel screen adjacent to the copper electrode. The electrodes with the insulating layer therebetween were placed on a ceramic insulating member and placed in a container having a copper plate adjacent to the sheet nickel electrode. The assembly was placed in a container which was evacuated to a pressure of 33 millimeters of mercury and contained an atmosphere of 4 parts of helium and one part of hydrogen. Leads were attached to the electrodes and connected to a power supply with the nickel electrode being made negative. After the switch was closed to activate the heating device, a current of 0.3 amp. was produced. The voltage drop was 260 volts. A glow discharge was initiated within the perforations of the insulating layer between the opposed electrodes to heat the upper surface of the copper plate which was in contact with the negative electrode.

While other modifications of this invention and variations thereof which may be embraced within the scope of the invention have not been described, the invention is intended to include such that may be embraced within the following claims.

What we claim as new and desire to secure by Letters Patent of the United States is:

1. A heating device comprising an insulating member, a first electrode positioned on said member, an insulating layer positioned on said first electrode, said layer having a plurality of perforations therethrough, ion conducting means joining adjacent perforations, a second electrode positioned on said layer, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

2. A heating device comprising an insulating member, a first electrode positioned on said member, an insulating layer positioned on said first electrode, said layer having a plurality of perforations therethrough, a plurality of grooves on one surface of said layer joining adjacent perforations, a second electrode positioned on said layer, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

3. A heating device comprising an insulating member, a first electrode positioned on said member, an insulating layer positioned on said first electrode, said layer having a plurality of perforations therethrough, a plurality of grooves on both surfaces of said layer joining adjacent perforations, a second electrode positioned on said layer, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

4. A heating device comprising an insulating member, a first electrode positioned on said member, an insulating layer positioned on said first electrode, said layer having a plurality of perforations therethrough, a screen positioned on one surface of said layer providing an ion conducting path joining adjacent perforations, a second electrode positioned on said screen, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

5. A heating device comprising an insulating member, a first electrode positioned on said member, a screen positioned on said first electrode, an insulating layer positioned on said screen, said layer having a plurality of perforations therethrough, a second screen positioned on said layer, said screens providing an ion conducting path joining adjacent perforations, a second electrode positioned on said layer, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

6. A heating device comprising an insulating member, a first electrode positioned on said member, an insulating layer positioned on said first electrode, said layer having a plurality of perforations therethrough, a support member positioned on said layer, said support member comprising a plurality of enclosure members with spaces therebetween communicating with said perforations, each of said enclosure members between adjacent perforations provided with an aperture, said support member with associated apertures and spaces providing an ion conducting path joining adjacent perforations, a second electrode positioned on said layer, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

7. A heating device comprising an insulating member, a first electrode positioned on said member, an insulating layer having a plurality of perforations therethrough, a support member positioned on each surface of said layer, said support member comprising a plurality of enclosure members with spaces therebetween communicating with said perforations, each of said enclosure members between adjacent perforations provided with an aperture, said support members with associated apertures and spaces providing an ion conducting path joining adjacent perforations, one of said support members positioned on said first electrode, a second electrode positioned on the other of said support members, an electrically conductive container positioned on said member in gas-tight relationship therewith and contacting said second electrode, a gas at sub-atmospheric pressure within said container, an electrical lead contacting said first electrode, a second electrical lead contacting said container, said leads adapted to be connected to a power source, and a ground lead for said container.

No references cited.